(12) United States Patent
Larsson et al.

(10) Patent No.: US 11,496,413 B2
(45) Date of Patent: Nov. 8, 2022

(54) ALLOCATING CLOUD COMPUTING RESOURCES IN A CLOUD COMPUTING ENVIRONMENT BASED ON USER PREDICTABILITY

(71) Applicant: Telefonaktiebolaget LM Ericsson (publ), Stockholm (SE)

(72) Inventors: Tony Larsson, Stockholm (SE); Ignacio Manuel Mulas Viela, Stockholm (SE); Nicolas Seyvet, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 500 days.

(21) Appl. No.: 15/533,276

(22) PCT Filed: Dec. 23, 2014

(86) PCT No.: PCT/EP2014/079143
§ 371 (c)(1),
(2) Date: Jun. 5, 2017

(87) PCT Pub. No.: WO2016/101996
PCT Pub. Date: Jun. 30, 2016

(65) Prior Publication Data
US 2017/0339069 A1    Nov. 23, 2017

(51) Int. Cl.
*H04L 47/70* (2022.01)
*G06F 9/50* (2006.01)
*H04L 67/50* (2022.01)
*H04L 67/10* (2022.01)
*G06N 7/00* (2006.01)

(52) U.S. Cl.
CPC .......... *H04L 47/823* (2013.01); *G06F 9/5061* (2013.01); *G06F 9/5072* (2013.01); *H04L 67/10* (2013.01); *H04L 67/535* (2022.05); *G06F 2209/5019* (2013.01); *G06N 7/005* (2013.01)

(58) Field of Classification Search
CPC ..... G06F 13/00; H04L 12/5695; H04L 29/06; H04L 29/0809; H04L 29/08072; H04L 29/08135; H04L 29/08144; H04L 29/08171; H04L 12/58; H04L 12/581; H04L 12/585; H04L 12/5855; H04L 29/08; H04L 29/06047; H04L 63/08; H04L 63/102; H04L 67/1097; H04L 67/2847; H04L 47/823; H04L 67/10; H04L 67/22;
(Continued)

(56) References Cited

U.S. PATENT DOCUMENTS

2014/0280485 A1* 9/2014 A Hummaida ..... H04L 67/1097
709/203
2015/0287091 A1* 10/2015 Koran ................ G06Q 30/0277
705/14.66

OTHER PUBLICATIONS

Eldardiry, Hoda, et al. "Multi-domain information fusion for insider threat detection." 2013 IEEE Security and Privacy Workshops. IEEE. (Year: 2013).*
(Continued)

*Primary Examiner* — John M MacIlwinen
(74) *Attorney, Agent, or Firm* — Coats & Bennett, PLLC (57) ABSTRACT

A method of allocating cloud computing resources in a cloud computing environment to a user is disclosed. The method comprises determining a prediction accuracy score for each user indicative of their user predictability, and allocating cloud computing resources to each user dependent on their user predictability.

14 Claims, 9 Drawing Sheets

(58) Field of Classification Search
CPC ...... G06Q 10/107; G06Q 30/02; H94L 67/00; H94L 67/02; H94L 67/1097; G06N 7/005
USPC .................................... 709/203, 226, 229
See application file for complete search history.

(56) References Cited

OTHER PUBLICATIONS

Guo, Chang Jie, et al. "A framework for native multi-tenancy application development and management." The 9th IEEE International Conference on E-Commerce Technology and The 4th IEEE International Conference on Enterprise Computing, E-Commerce and E-Services (CEC-EEE 2007). IEEE. (Year: 2007).*

OpenStack, "OpenStack Configuration Reference", pp. 1-5, retrieved on May 23, 2017, retrieved from Internet https://docs.openstack.org/ocata/config-reference/.

Shen, Z. et al., "CloudScale: Elastic Resource Scaling for Multi-Tenant Cloud Systems", ACM Symposium on Cloud Computing, Oct. 27-28, 2011, pp. 1-15, Cascais, Portugal.

Kundu, S. et al., "Modeling Virtualized Applications using Machine Learning Techniques", Proceedings of the 8th ACM SIGPLAN/SIGOPS Conference on Virtual Execution Environments, Mar. 3-4, 2012, pp. 1-12, London, England, UK.

Gong, Z. et al., "PRESS: PRedictive Elastic ReSource Scaling for cloud systems", 2010 International Conference on Network and Service Management, Oct. 25, 2010, pp. 9-16.

Tan, Y. et al., "PREPARE: Predictive Performance Anomaly Prevention for Virtualized Cloud Systems", 2012 32nd IEEE International Conference on Distributed Computing Systems, Jun. 18-21, 2012, pp. 285-294, Macau, China.

Schwarzkopf, M., et al., "Omega: flexible, scalable schedulers for large compute clusters", Proceedings of the 8th ACM European Conference on Computer Systems, Apr. 15-17, 2013, pp. 351-364, Prague, Czech Republic.

VMWARE, The CPU Scheduler in VMware vSphere 5.1, Performance Study, Technical Whitepaper, Jan. 23, 2013, pp. 1-26.

Mark, C. et al., "Evolutionary Optimal Virtual Machine Placement and Demand Forecaster for Cloud Computing", 2011 International Conference on Advanced Information Networking and Applications, Mar. 22, 2011, pp. 348-355.

Verma, M. et al., "Resource Demand Prediction in Multi-tenant Service Clouds", 2013 IEEE International Conference on Cloud Computing in Emerging Markets, Oct. 16, 2013, p. 1-8.

Tadrous, J. et al., "Pricing for Demand Shaping and Proactive Download in Smart Data Networks", 2013 IEEE INFOCOM Workshop, Apr. 14, 2013, pp. 3189-3194.

\* cited by examiner

ALLOCATING CLOUD COMPUTING RESOURCES IN A CLOUD COMPUTING ENVIRONMENT BASED ON USER PREDICTABILITY

TECHNICAL FIELD

Embodiments herein relate to a method, an apparatus and a server for allocating cloud computing resources in a cloud computing environment.

BACKGROUND

Cloud computing is computing in which large groups of remote servers are networked to allow centralized data storage and online access to computer services or resources. This converged infrastructure enables shared services between a number of users. Cloud computing may be used to implement a variety of computational paradigms, such as virtual machines, jobs, remote procedure calls, traditional servers, etc.

Cloud computing resources are usually not only shared by multiple users but are also dynamically allocated per demand. It is known to provide a resource scheduler that is configured to allocate cloud computing resources between users upon request.

The decisions of a resource scheduler where to allocate resources are essential for maintaining a proper load on the infrastructure and to prevent uneven distribution of resources in the cloud computing infrastructure. In a normal cluster of servers, the aggregated number of (central processing unit) CPU cores, memory, network or disk capacities can reach very high levels and achieving a shared load are critical for good performance.

When making decisions, a resource scheduler usually takes into account the available resources and any special requirements such as whether to run a virtual machine in a specific host, or allocate a virtual machine in a particular geographical area. There are many requirements on a resource scheduler as it constantly needs to evaluate what resources are available and trying to meet the demands of the users.

It is known to provide a resource scheduler that uses parallelism, shared state and lock-free optimistic concurrency control. This scheduler is suitable for large clusters. [Schwarzkopf, Z., Konwinski, A., Abd-El-Malek, M., and Wilkes J., *Omega: flexible, scalable schedulers for large compute clusters*, SIGOPS European Conference on Computer systems (EuroSys), ACM, Prague, Czech Republic (2013), pp. 351-364].

It is also known to provide a scheduler that follows a weight mechanism in order to decide where to allocate newly incoming requests. The scheduler creates a "weight" for each of the servers connected to a cluster and takes into account the consumed resources by the virtual resources allocated on it. In this way these resources are ordered in a prioritized list of hosts. The resource scheduler can then allocate the asked resources and comply with the available ones on a given host [*OpenStack, Nova Scheduler, OpenStack Configuration Reference*, Dec. 16, 2014, pp. 252-267].

It is also known to provide a resource scheduler that focuses on CPU performance. For example, a CPU Scheduler developed by VMWARE® comprises load balancers algorithms to ensure that the load of users is equally distributed [*VMware, The CPU Scheduler in WMware vSphere® 5.1, Performance study, Technical Whitepaper*].

Disadvantages with known resource schedulers include the resource schedulers mainly relying on current utilization of resources for a few selected metrics such as CPU, random access memory (RAM) or disc capacity, and so decisions of allocation are primarily only taken when a new application is started up and does not redistribute resources during operation. Furthermore, known resource schedulers do not take into account the type of application or mix of application types running on the same cluster of servers. Therefore, the performance of users and applications can be reduced or considered to be unsatisfactory.

SUMMARY

According to an aspect of the present invention, there is provided a method of allocating cloud computing resources in a cloud computing environment to a user, the method comprising determining a prediction accuracy score for each user indicative of their user predictability, and allocating cloud computing resources to each user dependent on their user predictability.

In one embodiment, the prediction accuracy score is determined for a user each time could computing resources are to be allocated to said user.

In another embodiment, the prediction accuracy score is based on previous usage information of each user.

The method may further comprise collecting previous usage information of each user. The previous usage information may be based on or comprise the behaviour of each user of at least the previous hour, day, week, month or year.

In yet another embodiment, the method further comprises creating a prediction model for each user based on the usage information so as to determine the prediction accuracy score.

In one embodiment, the method comprises sorting the users in numerical order of their prediction accuracy score. The method may then also comprise dividing the users so as to create groups of users, wherein the groups differ in user predictability.

In another embodiment, the method may further comprise pre-determining ranges of predictability accuracy scores so as to create groups and then assigning each user to the group which has the range in which the user's prediction accuracy score falls within.

In an alternative embodiment, the method may further comprise grouping users according to their prediction accuracy score so as to create groups of users with different user predictability.

In one embodiment, the method comprises applying a system policy to the groups of different user predictabilities so to allocate cloud computing resources to each user.

In accordance with another aspect of the invention, there is provided an apparatus for allocating cloud computing resources in a cloud computing environment to a user, the apparatus comprising a prediction module for determining a prediction accuracy score for each user indicative of their user predictability, and a resource allocator for allocating cloud computing resources to each user dependent on their user predictability.

In one embodiment, the prediction accuracy score is determined for a user each time could computing resources are to be allocated to said user In another embodiment, the apparatus further comprises a data collection module for collecting previous usage information of user.

The prediction module may be configured to determine a prediction accuracy score based on the previous usage information of each user.

In one embodiment, the prediction module comprises a training sub-module and a test sub-module for creating a prediction model for each user, the prediction model being based on the previous usage information so as to determine a prediction accuracy score.

In yet another embodiment, the apparatus may further comprise a sorting module for sorting the users in numerical order of their prediction accuracy score. The apparatus may further comprise a grouping module for dividing the users so as to create groups of users, wherein the groups have different user predictabilities.

In an alternative embodiment, the apparatus further comprises a grouping module for pre-determining ranges of predictability accuracy scores so as to create groups and then assigning each user to the group which has the range in which the user's prediction accuracy score falls within.

In yet another embodiment, the apparatus comprises a grouping module for grouping users according to their prediction accuracy score so as to create groups of users with different user predictabilities.

In one embodiment, the resource allocator module may further be configured to apply a system policy to the groups of different user predictability so to allocate cloud computing resources to each user.

In accordance with yet another aspect of the invention, there is provided a cloud computing resource scheduler comprising the apparatus mentioned above.

In accordance with a further aspect of the invention, there is provided a server comprising the apparatus mentioned above.

In accordance with yet another aspect of the invention above, there is provided an apparatus for allocating cloud computing resources in a cloud computing environment to a user, the apparatus comprising a processor, and a memory, said memory containing instructions executable by said processor, whereby the apparatus is operative to determine a prediction accuracy score for each user indicative of their user predictability, and to allocate cloud computing resources to each user dependent on their user predictability.

In one embodiment, the apparatus is operative such that the prediction accuracy score is determined for a user each time could computing resources are to be allocated to said user.

In another embodiment, the apparatus is operative to such that the prediction accuracy score is based on previous usage information of each user.

The apparatus may be operative to collect previous usage information of each user. The previous usage information may be based on or comprise the behaviour of each user of at least the previous hour, day, week, month or year.

In yet another embodiment, the apparatus is operative to further create a prediction model for each user based on the usage information so as to determine the prediction accuracy score.

In one embodiment, the apparatus is operative to sort the users in numerical order of their prediction accuracy score. The apparatus may be operative to also divide the users so as to create groups of users, wherein the groups differ in user predictability.

In another embodiment, the apparatus is operative to pre-determine ranges of predictability accuracy scores so as to create groups and then assigning each user to the group which has the range in which the user's prediction accuracy score falls within.

In an alternative embodiment, the apparatus is operative to group users according to their prediction accuracy score so as to create groups of users with different user predictability.

In one embodiment, the apparatus is operative to apply a system policy to the groups of different user predictabilities so to allocate cloud computing resources to each user.

In accordance with another aspect of the invention, there is provided a cloud computing application configured to request cloud computing resources from a cloud computing environment, wherein the cloud computing application is allocated cloud computing resources by a cloud computing resource scheduler dependent on the user predictability of said cloud computing application.

In accordance with yet another aspect of the invention, there is provided a computer program comprising instructions which when executed on at least one processor, cause the at least one processor to carry out the method according to any of the appended claims 1 to 10.

In accordance with a further aspect of the invention, there is provided a computer storage medium containing program instructions for allocating cloud computing resources in a cloud computing environment to a user, wherein execution of the program instructions by one or more processors of a computer system causes the one or more processors to carry out the method according to any of the appended claims 1 to 10.

In accordance with another aspect of the invention, there is provided a carrier comprising a computer program of the appended claims 1 to 10, wherein said carrier is one of an electronic signal, an optical signal, an electromagnetic signal, a magnetic signal, an electric signal, a radio signal, a microwave signal, or a computer-readable storage medium.

In accordance with yet another aspect of the invention, there is provided an apparatus for allocating cloud computing resources in a cloud computing environment to a user, the apparatus comprising a prediction module configured to determine a prediction accuracy score for each user indicative of their user predictability, and a resource allocator configured to allocate cloud computing resources to each user dependent on their user predictability.

BRIEF DESCRIPTION OF THE DRAWINGS

Embodiments will now be described by way of example only in relation to the enclosed drawings, in which.

DETAILED DESCRIPTION

An aspect of the present invention relates to a method of allocating cloud computing resources in a cloud computing environment to a user. The method comprises determining a prediction accuracy score of each user which is indicative of their user predictability, and allocating cloud computing resources to each user dependent on their user predictability. The method provides the advantage that users will receive a more stable service. It also enables less predictable users to be identified and scheduled accordingly so to reduce their impact on the performance of more predictable users.

It should be understood that the term "user" used herein includes an application, such as a cloud computing application. Examples of cloud computing applications include applications utilizing cloud computing, such as web email application, a data storage application, or an application for running a virtual machine. The term "user" also includes a computer program, a person, or a device. Examples of a device include a computer, laptop, tablet, smart phone, mobile communication device or constrained devices.

It should also be understood that the term "user predictability" used herein includes the predictability of the behavior of a user, for example, whether their future behavior, in terms of what cloud computing resources they will request or their demand on a cloud computing infrastructure, can be easily predicted or not.

Figure 1:
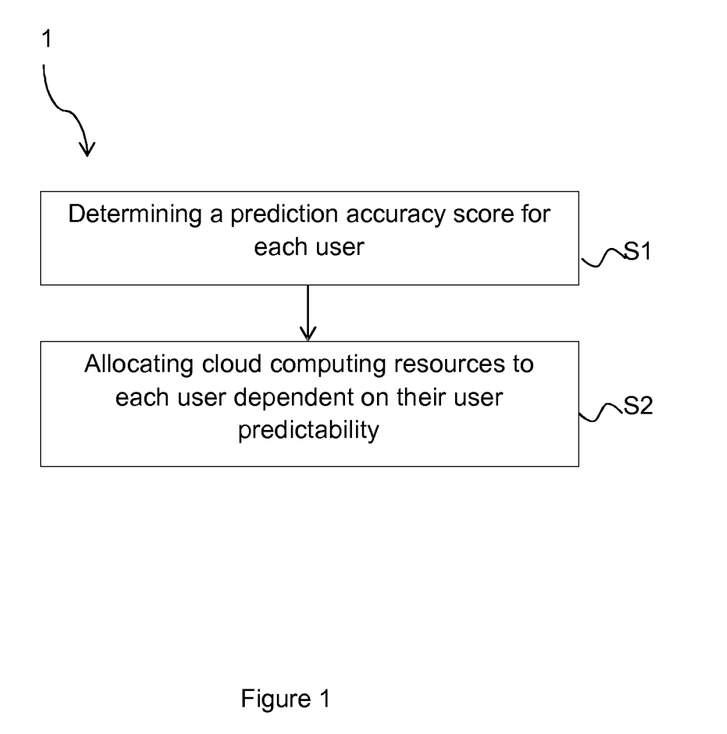
FIG. 1 shows a flow diagram of a method according to an embodiment of the present invention.

Referring now to FIG. 1, a method 1 according to an embodiment of the present invention is shown. The method 1 relates to allocating cloud computing resources in a cloud computing environment to a user. Cloud computing resources include, for example, central processing units (CPUs), random access memory (RAM), network bandwidth and disk capacity. A cloud computing environment should be understood as an environment of cloud computing, for example cloud computing infrastructure.

The method shown in FIG. 1, comprises determining a prediction accuracy score for each user, S1. The prediction accuracy score is a measure of a test's accuracy and examples of prediction accuracy scores, include $F_1$ score, prediction, recall and fit values. The prediction accuracy score determined for each user indicates the user predictability of said user, for example whether their behavior and demands for cloud computing resources can be foreseen. After the prediction accuracy score has been determined for each user, cloud computing resources are allocated to each user dependent or based on their user predictability as indicated by S2 in FIG. 1. Thus, each user is allocated cloud computing resources depending on their previous usage pattern. For example, if a user's previous usage pattern indicates that the user is unpredictable in its request for resources of the cloud computing environment, then a particular system policy can be applied in order to improve the allocation of cloud computing resources. For example, a system policy may be applied wherein the cloud computing resources are being distributed evenly between users having a range of prediction accuracy scores. Alternatively, a system policy may be applied wherein users having a prediction accuracy score below a certain value is separated from the remaining users as these are considered unpredictable. These unpredictable users can then be allocated designated hardware so as not to interfere with the performance of users having a prediction accuracy score value higher than a particular value which is considered to be predictable.

Another advantage of allocating cloud computing resources dependent on the user predictability of the users is that the performance of each user is easier to regulate. For example, by mixing or isolating users with different user predictabilities, the load on the cloud computing infrastructure can more easily be managed.

In one embodiment, the method describe in the above embodiment may also comprise the determination of a prediction accuracy score based on previous usage information of, for example, the previous, hour(s) day(s), week(s), month (s) or year (s), so as to create a prediction accuracy score that reflects a long term behavior of a user. Furthermore, the method described with reference to FIG. 1 may be carried out continuously or at regular intervals so that the allocation of cloud computing resource are constantly adapted to changes in type of users requesting resources as well as their behaviors. In yet another embodiment, the prediction accuracy score is continuously or at regular intervals or on demand recalculated so that any changes to the user's behavior or user predictability can be taken into account for future allocation or re-allocation of resources. This means that the prediction accuracy score may be determined for a user each time could computing resources are to be allocated to said user.

Another embodiment will now be described with reference to FIG. 2. In this figure, a method 2 is disclosed of allocating cloud computing resources in a cloud computing environment to a user. It is similar to the embodiment described with reference to FIG. 1, however it also comprises some additional optional steps as will now be explained.

The method comprises collecting previous usage information of each user, S11. The previous usage information comprises previous or earlier management of cloud computing resources of each user. This can include creation, deletion, starting and/or stopping of a service running on a virtual machine. It may also include the performance of each service, running on a virtual machine. Thus, previous usage information comprises past behavior or pattern of each user. The previous usage information is collected from a node such as a server which stores said previous usage information for each user.

Figure 2:
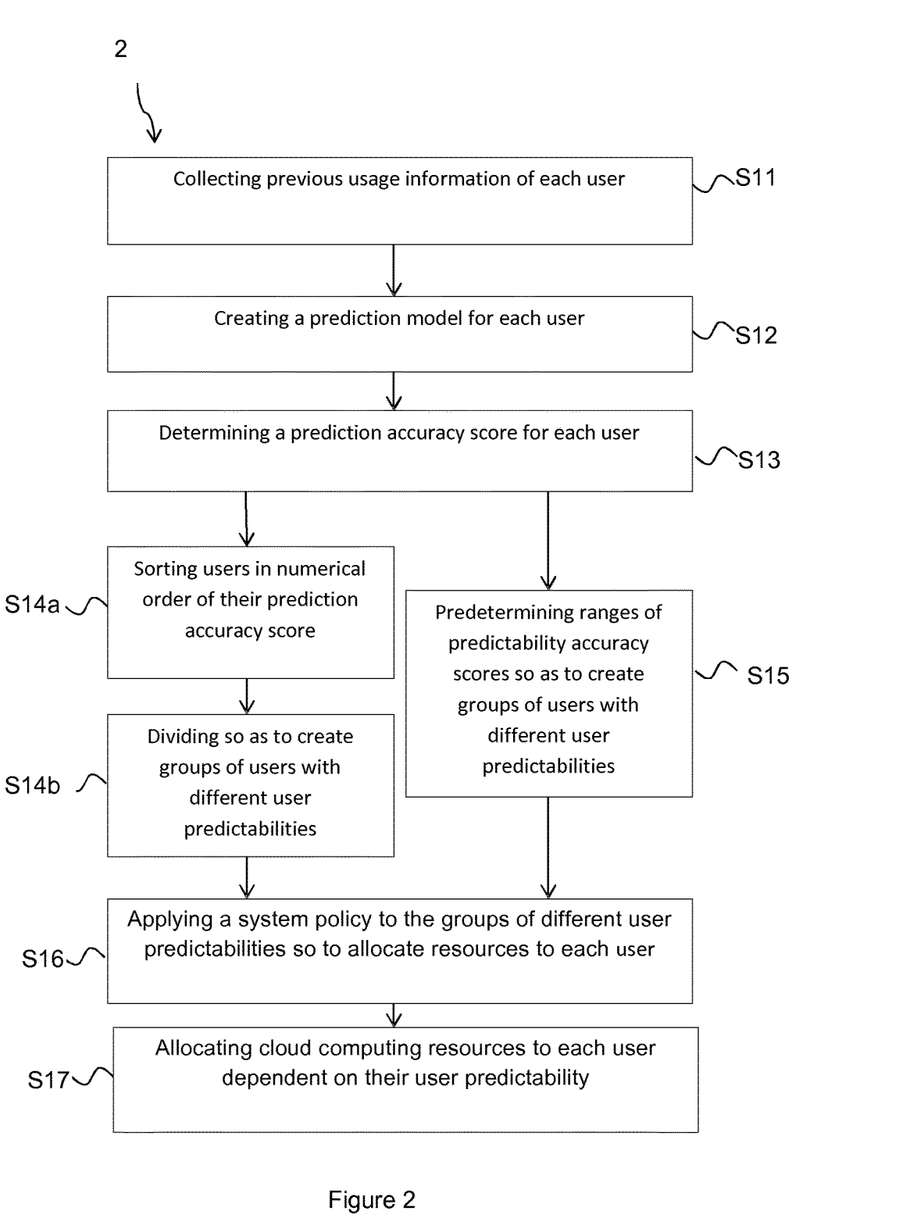
FIG. 2 shows a flow diagram of a method according to another embodiment of the present invention.

The method further comprises creating a prediction model for each user as indicated by S12 in FIG. 2. This involves inputting previous usage information into an algorithm so as to create a prediction model which determines or calculates a prediction accuracy score for each user. The prediction model may be created using a machine learning method or other statistical method including neural networks, time-series decomposition. The data input into the algorithm to create the prediction model is a set of previous usage information. Once the prediction model has been created, another set of previous usage information is used as input into the prediction model in order to calculate the prediction accuracy score as also described with reference to FIG. 1. Thus, a prediction accuracy score is determined for each user, S13.

Figure 7:
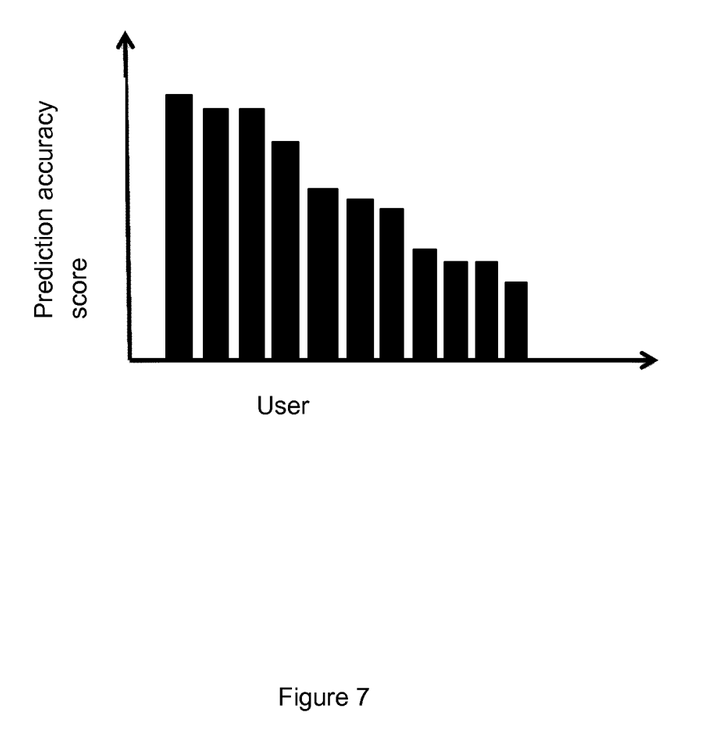
FIG. 7 shows a schematic illustration of an embodiment of the present invention.
Figure 8:
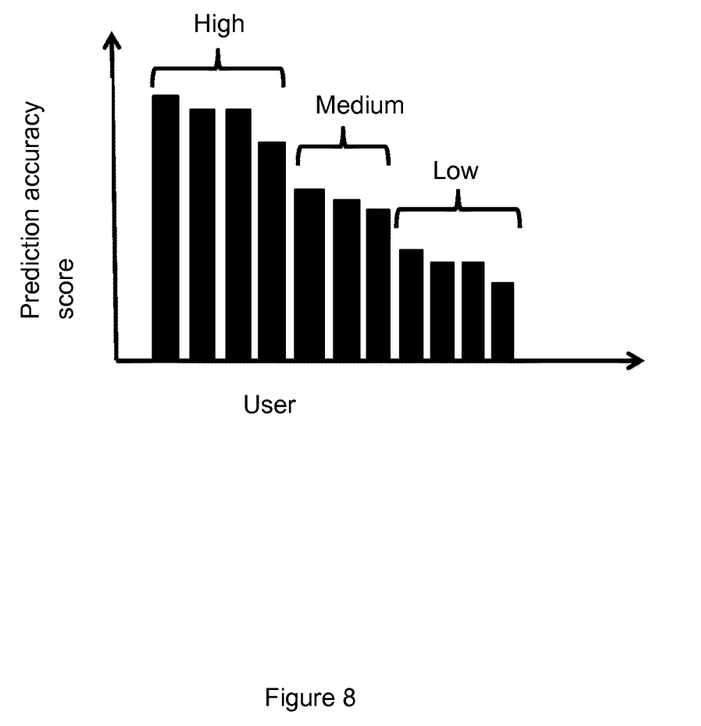
FIG. 8 shows a schematic illustration of another embodiment of the present invention.

Once the prediction accuracy score is determined for each user, users may be sorted in numerical order of their prediction accuracy score as indicated by S14a and further schematically illustrated in FIG. 7. Thereafter, the users are divided so as to create groups of users with different user predictability as indicated by S14b and schematically illustrated in FIG. 8. In FIG. 8, the users have been divided into three groups of high, medium and low predictability. It can also be considered that each group of users is classified in terms of predictability. For example, if there are three groups of users with different user predictabilities, the groups may be classified as high, medium, or low user predictability. The user predictability of each group can be based on an average or a mean prediction accuracy score. It should be understood that the present invention is not limited to three groups of user predictability. The users can be divided into any suitable number of groups.

In an alternative embodiment, the steps S14a and S14b as discussed above and shown in FIG. 2, are replaced by step S15. In this step, the method comprises predetermining ranges of predictability accuracy scores so as to create groups users with different user predictabilities. It can also be considered that each group of users is classified in terms of predictability. For example, if there are three groups of users with different user predictabilities, the groups may be classified as high, medium, or low user predictability. The user predictability of each group can be based on an average or a mean prediction accuracy score. Each user is then assigned to the group which has the range in which the user's prediction accuracy score falls within.

It should be understood that the present invention is not limited to S14a, S14b and 15 as described above, the method may comprise any alternative way of grouping users according to their prediction accuracy score so as to create groups users with different user predictabilities. It should also be understood that the embodiments according to the present invention are not limited to groups of users, it should be understood that sorting and grouping of the users may result in lists of users, e.g. high user predictability: [user a, user b, user c . . . ]; medium user predictability: [ user m, user n, user o . . . ]; and low user predictability: [user x, user y, user z . . . ].

The method may further comprise applying a system policy to the groups of different user predictabilities so to allocate cloud computing resources to each user as indicated by S16 in FIG. 2. For example, one system policy may be to fairly distribute the resources between all groups of user predictabilities. In such an example, a user from each group or list is in turn allocated cloud computing resources in a round-robin fashion. This results in an even balance of the different groups of user predictability on each physical cloud computing resource.

In an alternative system policy, the group of, for example, low user predictability is isolated and allocated dedicated cloud computing resources. Thus, the performance of groups of medium and high user predictability is not affected by the unpredictable behavior of users in the group of low user predictability.

The method further comprises allocating cloud computing resources to each user dependent on their user predictability, S17, according to a system policy.

In addition, all the embodiments described with reference to FIG. 2 may also comprise the determination of a prediction accuracy score based on previous usage information of for example, the previous, hour(s), day(s), week(s), month (s) or year (s), so as to create a prediction accuracy score that reflects a long term behavior of a user. Furthermore, the methods described with reference to FIG. 2 may be carried out continuously or at regular intervals so that the allocation of cloud computing resource are constantly adapted to changes in type of user requesting resources as well as their behaviors. In yet another embodiment, the prediction accuracy score is continuously or at regular intervals or on demand recalculated so that any changes to the user's behavior or user predictability can be taken into account for future allocation or re-allocation of resources. This means that the prediction accuracy score may be determined for a user each time could computing resources are to be allocated to said user.

It should be understood that the embodiments described with reference to FIG. 2 share the same advantages as the embodiment described with reference to FIG. 1.

In one embodiment of the present invention, there is provided a computer program for allocating cloud computing resources in a cloud computing environment to a user. The computer program comprising computer readable code units which when run on a computer system causes the computer to carry out any of the methods described above.

In another embodiment, there is provided a computer program product which comprises the above mentioned computer program, and said computer program is stored on the computer program system.

Figure 3:
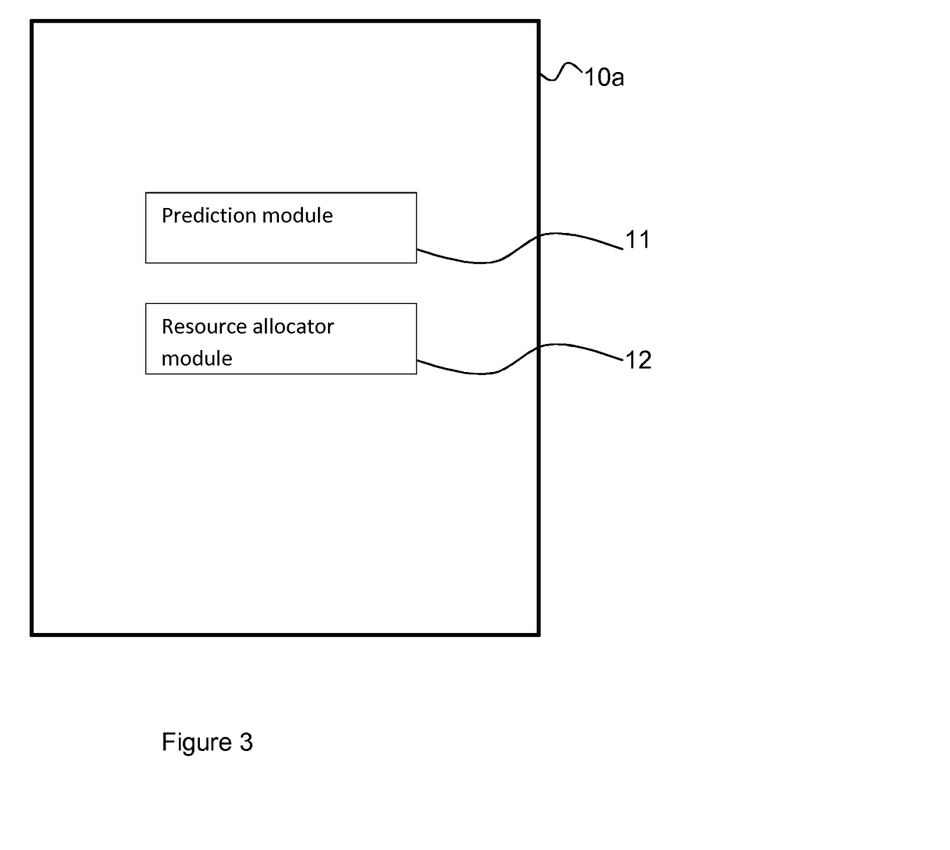
FIG. 3 shows a schematic illustration of an apparatus according to an embodiment of the present invention.

According to another embodiment of the present invention, there is provided an apparatus 10a for allocating cloud computing resources in a cloud computing environment to a user as illustrated in FIG. 3. The apparatus 10a implements the embodiments of the methods described above and comprises a prediction module 11 for determining a prediction accuracy score for each user which is indicative of their user predictability. The apparatus 10 further comprises a resource allocator 12 for allocating cloud computing resources to each user dependent on their user predictability.

Similar to the method described with reference to FIGS. 1 and 2, cloud computing resources include, for example, central processing units (CPUs), random access memory (RAM), network bandwidth and disk capacity. A cloud computing environment should be understood as an environment of cloud computing, for example cloud computing infrastructure.

In the embodiment shown in FIG. 3, the resource allocator module 12 allocates cloud computing resources to users depending on their previous usage pattern. For example, if a user's previous usage pattern indicates that the user is unpredictable in its request for resources of the cloud computing environment, then the resource allocator module 12 can apply a particular system policy in order to improve the allocation of resources. For example, the resource allocator module 12 can apply a system policy wherein the cloud computing resources are being distributed evenly between users having a range of prediction accuracy scores. Alternatively, the resource allocator module 12 can apply a system policy wherein cloud users having a prediction accuracy score below a certain value is separated from the remaining users as these are considered unpredictable. The unpredictable users can then be allocated designated hardware so not to interfere with the performance of users having a prediction accuracy score value higher than a particular value which is considered to be predictable.

Figure 4:
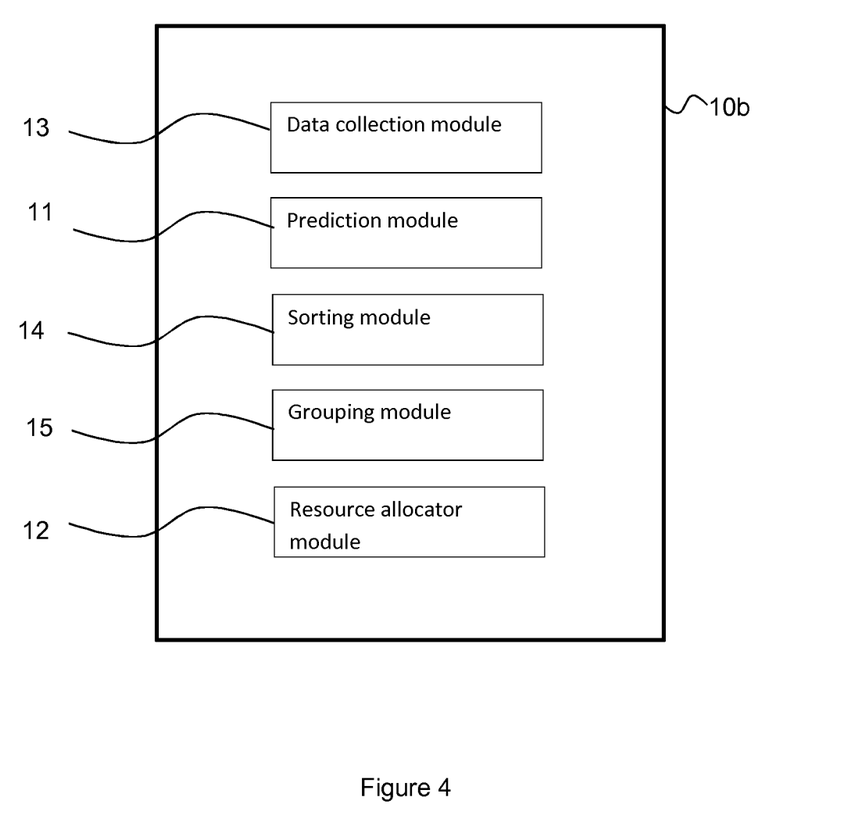
FIG. 4 shows a schematic illustration of an apparatus according to another embodiment of the present invention.

In another embodiment as shown in FIG. 4, an apparatus 10b is shown which optionally comprises a data collection module 13, a sorting module 14, a grouping module 15, in addition to the prediction module 11 and the resource allocator module 12.

In this embodiment, the data collection module 13 is for collecting previous usage information of each user. The data collection module 13 may be configured to collect previous usage information from a node such as a server storing such information. The usage information comprises management of cloud computing resources. The management of cloud computing resources includes creation, deletion, starting and stopping of a service such as a virtual machine. The management of cloud computing resources may also include the performance of each service such as virtual machine. Thus, previous usage information comprises past behavior or pattern of each user.

Figure 5:
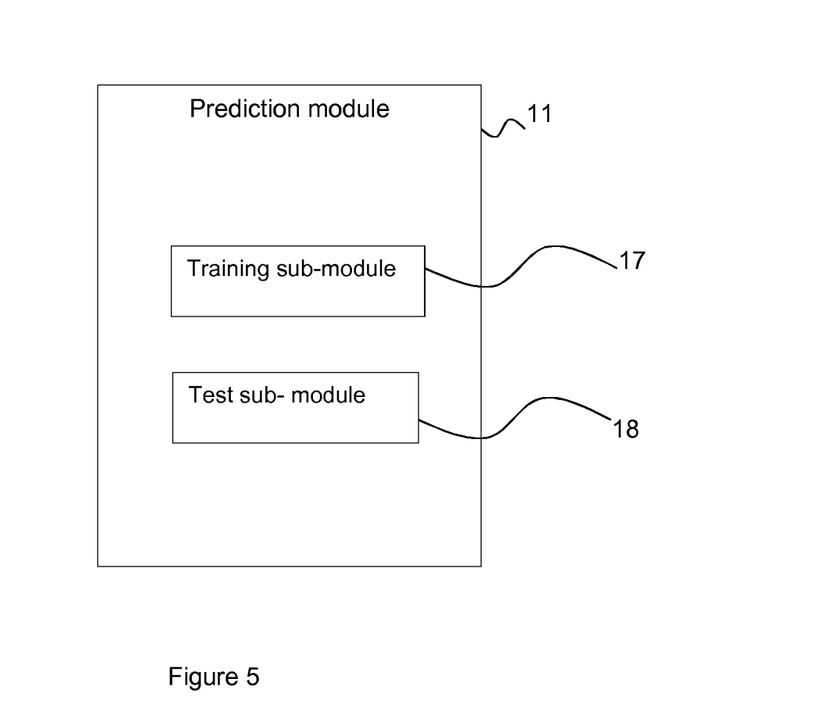
FIG. 5 shows a schematic illustration of an embodiment of the present invention.

The prediction module 11 is configured to determine a prediction accuracy score based on the previous usage information of each user. The prediction module 11 comprises a training sub-module 17 and a test sub-module 18 for creating a prediction model for each user as seen in FIG. 5. The prediction model is based on the previous usage information so as to determine the prediction accuracy score for each user. In one embodiment, the previous usage information is split into two datasets. One dataset is input into the training sub-module 17 comprising an algorithm for creating and/or training the prediction model. The algorithm may comprise a statistical method or a machine learning based method, for example, neural networks or time-series decomposition. The other dataset is input into the test sub-module 18 so to tests the prediction model and to determine the prediction accuracy score. The prediction accuracy score used in embodiments of the present invention includes, for example, F1 score, recall or fit values. The same method of calculating the prediction accuracy score should be used for all users so that the scores are comparable.

In one embodiment, the sorting module 14 as shown in FIG. 4 is for sorting the users in numerical order of their prediction accuracy score as schematically illustrated in FIG. 7.

The grouping module 15 is for dividing the users so as to create groups of users, wherein the groups differ in predictabilities as schematically illustrated in FIG. 8. It can also be considered that each group of users is classified in terms of predictability. For example, if there are three groups of users with different user predictabilities, the groups may be classified as high, medium, or low user predictability. The user predictability of each group can be based on an average or a mean prediction accuracy score.

In an alternative embodiment, the apparatus 10b does not comprise a sorting module, and the grouping module 15 is for pre-determining ranges of predictability accuracy scores so as to create groups and then assigning each user to the group which has the range in which the user's prediction accuracy score falls within. Also here it can also be considered that each group of users is classified in terms of predictability. For example, if there are three groups of users with different user predictabilities, the groups may be classified as high, medium, or low user predictability. The user predictability of each group can be based on an average or a mean prediction accuracy score.

In yet another alternative embodiment, the grouping module 15 is for grouping users according to their prediction accuracy score so as to create groups of users with different user predictability. Again, it can also be considered that each group of users is classified in terms of predictability. For example, if there are three groups of users with different user predictabilities, the groups may be classified as high, medium, or low user predictability. The user predictability of each group can be based on an average or a mean prediction accuracy score.

Similar to the method described above with reference to FIGS. 1 and 2, the grouping module is not limited to creating groups of users. Alternatively, it may create lists of users having different user predictabilities.

Similar to the embodiment shown in FIG. 3, the resource allocator 12 module is for applying a system policy to the groups of different user predictability so to allocate cloud computing resources to each user. The resource allocator is configured to consider the system policies and the groups/lists so as to allocate cloud computing resources accordingly.

It should be understood that the resource allocator 12 may apply system policies similar to those described above with reference to the method shown in FIGS. 1 and 2.

In addition, all the embodiments described with reference to FIGS. 3 and 4 may further comprise a prediction module 11 as previously described, however it may further be for determining a prediction accuracy score based on previous usage information of for example, the previous, hour(s), day(s), week(s), month (s) or year (s), so as to create a prediction accuracy score that reflects a long term behavior of a user. Furthermore, the prediction module 11 may be for determining a prediction accuracy score continuously or at regular intervals so that the allocation of cloud computing resource are constantly adapted to changes in type of user requesting resources as well as their behaviors. In yet another embodiment, the prediction accuracy score continuously or at regular intervals or on demand recalculated so that any changes to the user's behavior or user predictability can be taken into account for future allocation or re-allocation of resources. This means that the prediction accuracy score may be determined for a user each time could computing resources are to be allocated to said user.

The apparatuses 10a, 10b described herein also provides the same advantages as the method described above.

The data collection module 13, the prediction module 11, the sorting module 14, the grouping module 15 and the resource allocator module 12 described above with reference to FIGS. 3 and 4 are implemented in software, such as a computer program, executable by one or at least one processor.

In an alternative embodiment, the data collection module 13, the prediction module 11, the sorting module 14, the grouping module 15 and the resource allocator module 12 are implemented in hardware only, or in a combination in software and hardware.

In one embodiment, a cloud computing resource scheduler comprises any of the apparatuses 10a, 10b, 20 described herein. In an alternative embodiment, a server comprises any of the apparatuses 10a, 10b, 20 described herein.

Figure 6:
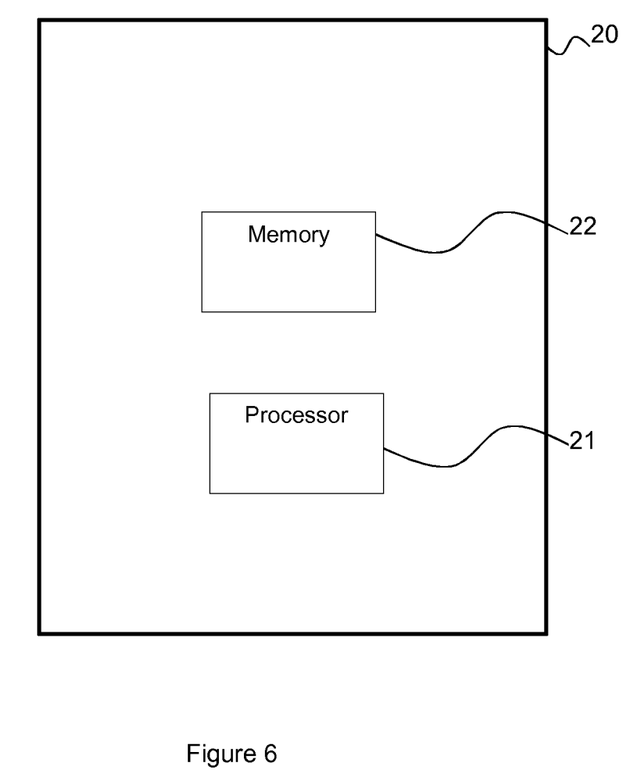
FIG. 6 shows a schematic illustration of another embodiment of the present invention.

An embodiment of the present invention will now be described with reference to FIG. 6. FIG. 6 illustrates an apparatus 20 for allocating cloud computing resources in a cloud computing environment to a user. The apparatus 20 comprises a processor 21, and a memory 22, said memory containing instructions executable by said processor 21. The apparatus 20 is operative for determining a prediction accuracy score for each user which is indicative of their user predictability, and allocating cloud computing resources to each user dependent on their user predictability.

This apparatus 20 comprises the same advantages as those described in relation to the embodiments of apparatus 10a, 10b, and the embodiments of methods 1 and 2.

There is also provided a computer program comprising instructions which when executed on at least one processor, cause the at least one processor to carry out the method described above.

In another embodiment, a computer storage medium containing program instructions for allocating cloud computing resources in a cloud computing environment to a user is provided, wherein execution of the program instructions by one or more processors of a computer system causes the one or more processors to carry out the method described above.

In yet another embodiment, a carrier comprising a computer program for allocating cloud computing resources in a cloud computing environment to a user is provided, wherein said carrier is one of an electronic signal, an optical signal, an electromagnetic signal, a magnetic signal, an electric signal, a radio signal, a microwave signal, or a computer-readable storage medium.

It should be understood that any reference to a processor herein is not limited to a single processor; it may include one or more processor or processing units. In one embodiment, a processor should also be understood to comprise a processor arrangement.

Furthermore, in an alternative embodiment of the present invention, at least some of the steps, functions, procedures and/or modules described herein may be implemented in software such as a computer program for execution by suitable processing circuitry such as one or more processors or processing units.

Figure 9:
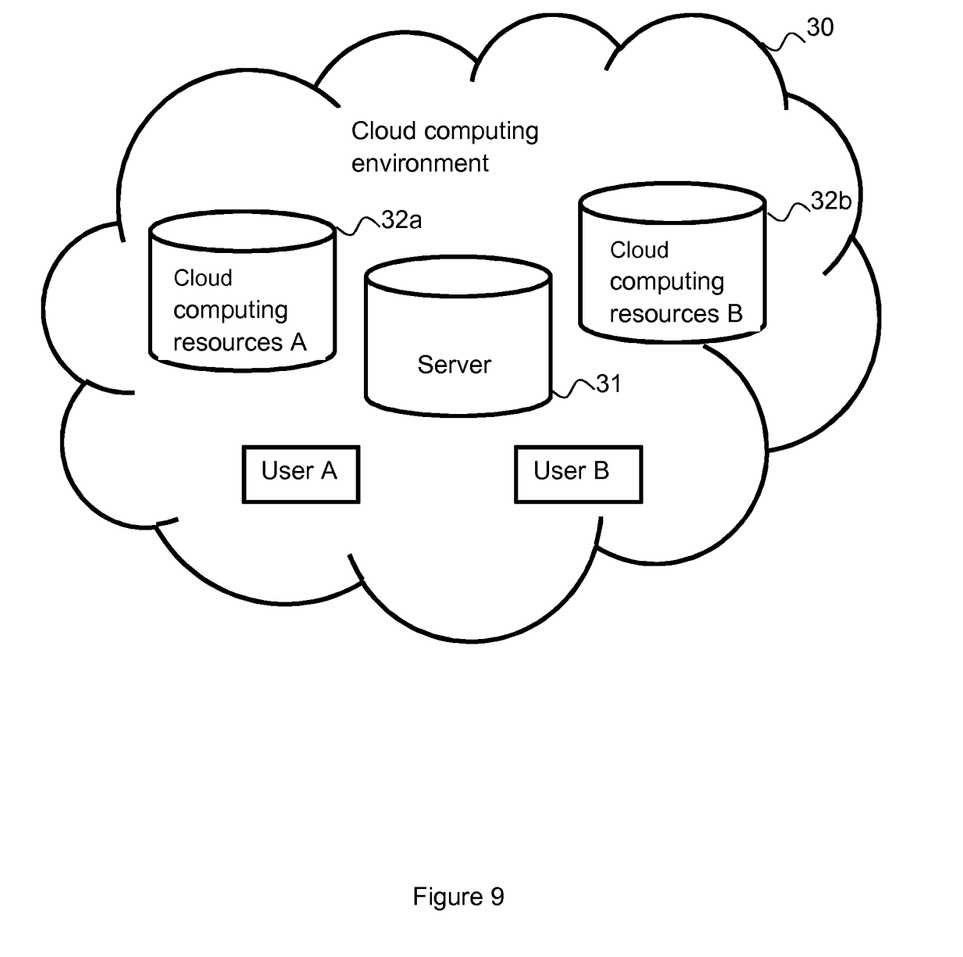
FIG. 9 shows a schematic illustration of yet another embodiment of the present invention.

An embodiment of the invention will now be described with reference to FIG. 9. FIG. 9 shows a cloud computing environment 30 comprising a server 31. The server 31 comprises a prediction module for determining a prediction accuracy score for each user indicative of their user predictability, and a resource allocator for allocating cloud computing resources to each user dependent on their user predictability. The prediction module and the resource allocator are shown in detail in FIG. 3. In this example, there is a User A and a User B which may request cloud computing resources 32a, 32b in order to, for example, run an application or a virtual machine. If, for example, User A and User B request cloud computing resources 32a, 32b from the server, the server 31 then determines the prediction accuracy score of each user and thereafter allocates cloud computing resources accordingly to each user. For example, if User A has a prediction accuracy score higher than a predetermined value, User A is considered predictable and will be allocated cloud computing resources accordingly. Whereas if User B has a prediction accuracy score below a predetermined value, User B is considered unpredictable and will be allocated could computing resources accordingly.

The way User A and User B are allocated resources depends on the system policies applied. For example, the resource allocator may apply a system policy where predictable users (User A) are allocated cloud computing resources from cloud computing resources A 32a, and unpredictable users (User B) are isolated and allocated cloud computing resources from cloud computing resources B 32b.

It should be understood that the server may also comprise a data collection module, a sorting module and a grouping module as described with reference to FIGS. 3 and 4.

In one embodiment of the present invention, User A in FIG. 9 is a cloud computing application configured to request cloud computing resources from the cloud computing environment, wherein the cloud computing application is allocated cloud computing resources by a cloud computing resource scheduler, for example of the server, dependent on the user predictability of said cloud computing application.

Various modifications may be made to the examples described in the foregoing, and any related teachings may be applied in numerous applications, only some of which have been described herein. It is intended by the following claims to claim any and all applications, modifications and variations that fall within the true scope of the present teachings.

The invention claimed is:

1. A method of allocating physical computing resources of a cloud computing environment, implemented by a network device, the method comprising:
   determining, for each of a plurality of users, a prediction accuracy score indicating an extent to which utilization of the physical computing resources of the cloud computing environment by the user is predictable;
   dividing the users so as to create groups of users for respective ranges of the prediction accuracy scores; and
   allocating the physical computing resources of the cloud computing environment evenly between the groups.

2. The method of claim 1, wherein the prediction accuracy score is determined for a user each time physical computing resources are to be allocated to the user.

3. The method of claim 1, wherein the prediction accuracy score is based on previous usage information of each user.

4. The method of claim 1, further comprising collecting previous usage information of each user.

5. An apparatus for allocating physical computing resources of a cloud computing environment, the apparatus comprising;
   processing circuitry;
   memory containing instructions executable by the processing circuitry whereby the apparatus is operative to:
      determine, for each of a plurality of users, a prediction accuracy score indicating an extent to which utilization of the physical computing resources of the cloud computing environment by the user is predictable;
      divide the users so as to create groups of users for respective ranges of the prediction accuracy scores; and
      allocate the physical computing resources of the cloud computing environment evenly between the groups.

6. The apparatus of claim 5, wherein the instructions are such that the apparatus is operative to determine the prediction accuracy score for a user each time physical computing resources are to be allocated to the user.

7. The apparatus of claim 5, wherein the instructions are such that the apparatus is operative to collect previous usage information of a user.

8. The apparatus of claim 7, wherein the instructions are such that the apparatus is operative to determine the prediction accuracy scores based respectively on previous usage information of each user.

9. The apparatus of claim 7, wherein the instructions are such that the apparatus is operative to create a prediction model for each user, the prediction model being based on the previous usage information so as to determine one or more of the prediction accuracy scores.

10. The apparatus of claim 5, wherein the instructions are such that the apparatus is operative to sort the users in numerical order of their prediction accuracy score.

11. The apparatus of claim 5, wherein the instructions are such that the apparatus is operative to predetermine the ranges of predictability accuracy scores and then assign each of the users to a group of users having a range that includes the user's prediction accuracy score.

12. The apparatus of claim 5, wherein the instructions are such that the apparatus is operative to apply a system policy to the groups so to allocate physical computing resources to each user.

13. A server, comprising:
   an apparatus configured to allocate physical computing resources of a cloud computing environment, the apparatus comprising processing circuitry and memory, the memory containing instructions executable by the processing circuitry whereby the apparatus is operative to:
      determine, for each of a plurality of users, a prediction accuracy score indicating an extent to which utilization of the physical computing resources of the cloud computing environment by the user is predictable;

divide the users so as to create groups of users for respective ranges of the prediction accuracy scores; and allocate the physical computing resources of the cloud computing environment evenly between the groups.

14. A non-transitory computer readable recording medium storing a computer program product for allocating physical computing resources of a cloud computing environment, the computer program product comprising software instructions which, when run on processing circuitry of a computer system in the cloud computing environment, causes the computer system to:

determine, for each of a plurality of users, a prediction accuracy score indicating an extent to which utilization of the physical computing resources of the cloud computing environment by the user is predictable;

divide the users so as to create groups of users for respective ranges of the prediction accuracy scores; and allocate the physical computing resources of the cloud computing environment evenly between the groups.

* * * * *